(12) United States Patent
Hart et al.

(10) Patent No.: US 8,277,355 B2
(45) Date of Patent: Oct. 2, 2012

(54) MULTI-SPEED TRANSMISSION HAVING STACKED PLANETARY GEAR SETS

(75) Inventors: James M. Hart, Belleville, MI (US);
Scott H. Wittkopp, Ypsilanti, MI (US);
James B. Borgerson, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 135 days.

(21) Appl. No.: 12/831,825

(22) Filed: Jul. 7, 2010

(65) Prior Publication Data

US 2012/0010038 A1 Jan. 12, 2012

(51) Int. Cl.
*F16H 3/44* (2006.01)
(52) U.S. Cl. .................. 475/282; 475/903; 475/277
(58) Field of Classification Search .......... 475/275–296, 475/330, 903
See application file for complete search history.

(56) References Cited

U.S. PATENT DOCUMENTS

| | | | |
|---|---|---|---|
| 4,224,838 A | 9/1980 | Roushdy et al. | |
| 4,229,996 A | 10/1980 | Hildebrand | |
| 4,683,776 A | 8/1987 | Klemen | |
| 5,285,111 A | 2/1994 | Sherman | |
| 5,429,557 A | 7/1995 | Beim | |
| 5,503,605 A | 4/1996 | Beim | |
| 5,558,173 A | 9/1996 | Sherman | |
| 5,919,111 A | 7/1999 | Park | |
| 5,993,347 A | 11/1999 | Park | |
| 6,976,930 B2* | 12/2005 | Winzeler | 475/277 |
| 7,699,736 B2 | 4/2010 | Diosi et al. | |
| 7,803,082 B2 | 9/2010 | Diosi et al. | |
| 7,824,302 B2 | 11/2010 | Diosi et al. | |
| 2006/0180366 A1 | 8/2006 | Brill et al. | |
| 2008/0153653 A1 | 6/2008 | Diosi et al. | |
| 2008/0269004 A1 | 10/2008 | Diosi et al. | |
| 2009/0048059 A1* | 2/2009 | Phillips et al. | 475/275 |
| 2009/0118059 A1* | 5/2009 | Phillips et al. | 475/275 |
| 2009/0305837 A1 | 12/2009 | Hiraiwa | |
| 2010/0019601 A1 | 1/2010 | Saban et al. | |
| 2010/0041507 A1 | 2/2010 | Gumpoltsberger et al. | |
| 2010/0041508 A1 | 2/2010 | Gumpoltsberger et al. | |
| 2010/0041509 A1 | 2/2010 | Gumpoltsberger et al. | |
| 2010/0044141 A1 | 2/2010 | Kimes et al. | |
| 2010/0139559 A1 | 6/2010 | Scott, Sr. et al. | |
| 2010/0210400 A1* | 8/2010 | Phillips et al. | 475/275 |
| 2010/0210402 A1* | 8/2010 | Phillips et al. | 475/275 |
| 2010/0311537 A1 | 12/2010 | Ziemer | |
| 2011/0009228 A1 | 1/2011 | Bauknecht et al. | |
| 2011/0009229 A1 | 1/2011 | Bauknecht et al. | |
| 2011/0111915 A1* | 5/2011 | Hart et al. | 475/271 |
| 2011/0256977 A1* | 10/2011 | Hart et al. | 475/275 |

FOREIGN PATENT DOCUMENTS

| | | |
|---|---|---|
| DE | 102008000428 | 9/2009 |
| DE | 102008041201 | 2/2010 |
| DE | 102009027775 | 1/2011 |
| EP | 0849498 | 6/1998 |
| WO | WO2010139553 | 12/2010 |
| WO | WO2010139559 | 12/2010 |

* cited by examiner

*Primary Examiner* — Sherry Estremsky
*Assistant Examiner* — Lillian Nguyen

(57) ABSTRACT

A transmission is has an input member, an output member, two stacked planetary gear sets, a third planetary gear set, a plurality of coupling members and a plurality of torque transmitting devices. The stacked planetary gear sets have a first, second, third, fourth and fifth member and the third planetary gear set has a first, second and third member. The torque transmitting devices include clutches and brakes.

20 Claims, 4 Drawing Sheets

| Gear State | Gear Ratio | Gear Step | Clutching Elements | | | | | |
|---|---|---|---|---|---|---|---|---|
| | | | 32 | 34 | 28 | 26 | 36 | 30 |
| Rev | -4.004 | | | x | x | | x | |
| N | | -0.80 | | o | | | o | |
| 1st | 4.989 | | | x | | | x | x |
| 2nd | 2.987 | 1.67 | x | | | | x | x |
| 3rd | 1.992 | 1.50 | | | | x | x | x |
| 4th | 1.377 | 1.45 | | | | x | x | x |
| 5th | 1.000 | 1.38 | | | x | x | | x |
| 6th | 0.830 | 1.20 | x | | | x | | x |
| 7th | 0.731 | 1.14 | | x | | x | | x |
| 8th | 0.620 | 1.18 | x | x | | x | | |
| 9th | 0.521 | 1.19 | | x | x | x | | | x = On, Carrying Torque
O = On, NOT Carrying Torque

| Gear State | Gear Ratio | Gear Step | Clutching Elements ||||||
|---|---|---|---|---|---|---|---|---|
| | | | 32 | 34 | 28 | 26 | 36 | 30 |
| Rev | -4.196 | | | x | x | | x | |
| N | | -0.80 | | o | | | o | |
| 1st | 5.228 | | | x | | | x | x |
| 2nd | 3.130 | 1.67 | x | | | | x | x |
| 3rd | 2.087 | 1.50 | | | x | | x | x |
| 4th | 1.435 | 1.45 | | | | x | x | x |
| 5th | 1.000 | 1.43 | | | x | x | | x |
| 6th | 0.818 | 1.22 | x | | | x | | x |
| 7th | .0714 | 1.15 | | x | | x | | x |
| 8th | 0.600 | 1.19 | x | x | | x | | |
| 9th | 0.500 | 1.20 | | x | x | x | | | x = On, Carrying Torque
O = On, NOT Carrying Torque

*Fig-7*

MULTI-SPEED TRANSMISSION HAVING STACKED PLANETARY GEAR SETS

FIELD

The invention relates generally to a multiple speed transmission having a plurality of planetary gear sets and a plurality of torque transmitting devices and more particularly to a transmission having eight or more speeds, four planetary gear sets of which two are stacked and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets of which two are stacked to form a stacked planetary gear set arrangement, a plurality of coupling members and a plurality of torque transmitting devices. The torque transmitting devices are for example clutches and brakes.

In an aspect of the present invention, a first and a second set of planetary gear sets are provided having a sun gear, a carrier member for rotatably supporting a plurality of pinion gears and a ring gear member. The stacked planetary gear set arrangement has a sun gear, a first carrier member for rotatably supporting a first plurality of pinion gears, a second carrier member for rotatably supporting a second plurality of pinion gears, a ring gear and a common member.

In another embodiment of the present invention, an interconnecting member continuously interconnects the ring gear of the stacked planetary gear set arrangement with the sun gear of the planetary gear set.

In another embodiment of the present invention, a first interconnecting member continuously interconnects the carrier member of the first planetary gear set with the carrier member of the second planetary gear set.

In another embodiment of the present invention, a second interconnecting member continuously interconnects the ring gear of the first planetary gear set with the ring gear of the second planetary gear set.

In another embodiment of the present invention, a third interconnecting member continuously interconnects the sun gear of the first planetary gear set with the second carrier member of the stacked planetary gear set arrangement.

In another embodiment of the present invention, a fourth interconnecting member continuously interconnects the first carrier member of the stacked planetary gear set arrangement with the second carrier member of the stacked planetary gear set arrangement.

In still another embodiment of the present invention, a first torque transmitting mechanism is provided that is selectively engageable to interconnect the ring gear of the first planetary gear set with the input member.

In still another embodiment of the present invention, a second torque transmitting mechanism is provided that is selectively engageable to interconnect the sun gear of the stacked planetary gear set arrangement with the input member.

In still another embodiment of the present invention, a third torque transmitting mechanism is provided that is selectively engageable to interconnect the common member of the stacked planetary gear set arrangement with the input member.

In still another embodiment of the present invention, a fourth torque transmitting mechanism is provided that is selectively engageable to interconnect the sun gear of the stacked planetary gear set arrangement with the stationary member.

In another embodiment of the present invention, a fifth torque transmitting mechanism is provided that is selectively engageable to interconnect the ring gear member of the stacked planetary gear set arrangement with the stationary member.

In another embodiment of the present invention, a sixth torque transmitting mechanism is provided that is selectively engageable to interconnect the sun gear of the second planetary gear set with the stationary member.

In still another embodiment of the present invention, the torque transmitting mechanisms are selectively engageable in combinations of at least three to establish at least eight forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 7 is a truth table presenting the state of engagement of the various torque transmitting elements in each of the available forward and reverse speeds or gear ratios of the transmission illustrated in FIGS. 3 and 5.

DETAILED DESCRIPTION

The following description is merely exemplary in nature and is not intended to limit the present disclosure, application, or uses.

Figure 1:
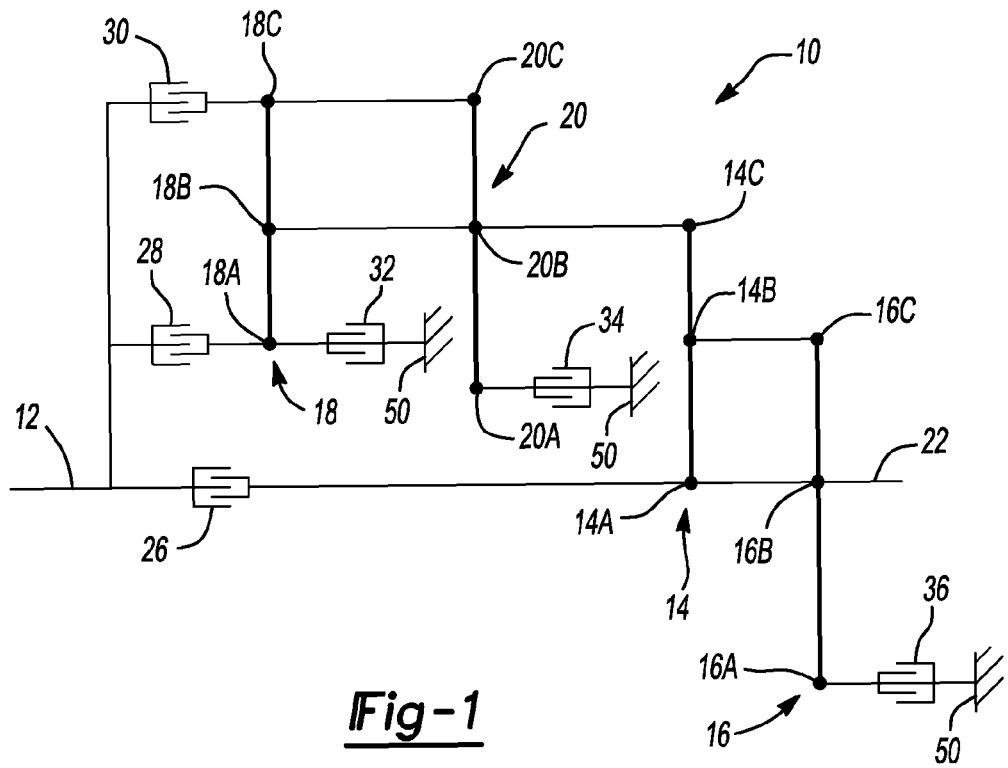
FIG. 1 is a lever diagram of an embodiment of a nine speed transmission according to the present invention.

Referring now to FIG. 1, an embodiment of a nine or more speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20 and an output shaft or member 22. The lever of the first planetary gear set 14 has three nodes: a first node 14A, a second node 14B and a third node 14C. The lever of the second planetary gear set 16 has three nodes: a first node 16A, a second node 16B and a third node 16C. The lever of the third planetary gear set 18 has three nodes: a first node 18A, a second node 18B and a third node 18C. The lever of the fourth planetary gear set 20 has three nodes: a first node 20A, a second node 20B and a third node 20C.

The output member 22 is continuously coupled to the first node 14A of the first planetary gear set 14 and to the second node 16B of the second planetary gear set 16. The first node 14A of the first planetary gear set 14 is coupled to the second node 16B of the second planetary gear set 16. The second node 14B of the first planetary gear set 14 is coupled to the third node 16C of the second planetary gear set 16. The third node 14C of the first planetary gear set 14 is coupled to the second node 20B of the fourth planetary gear set 20 and to the second node 18B of the third planetary gear set 18. The second node 18B of the third planetary gear set 18 is coupled to the second node 20B of the fourth planetary gear set 20. The third node 18C of the third planetary gear set 18 is coupled to the third node 20C of the fourth planetary gear set 20.

A first clutch 26 selectively connects the second node 14B of the first planetary gear set 14 and the third node 16C of the second planetary gear set 16 with the input member or shaft 12. A second clutch 28 selectively connects the first node 18A of the third planetary gear set 18 with the input member or shaft 12. A third clutch 30 selectively connects the third node 18C of the third planetary gear set 18 and the third node 20C of the fourth planetary gear set 20 with the input member or shaft 12. A first brake 32 selectively connects the first node 18A of the third planetary gear set 18 with a stationary member or transmission housing 50. A second brake 34 selectively connects the first node 20A of the fourth planetary gear set 20 with the stationary member or transmission housing 50. A third brake 36 selectively connects the first node 16A of the second planetary gear set 16 with the stationary member or transmission housing 50.

Figure 2:
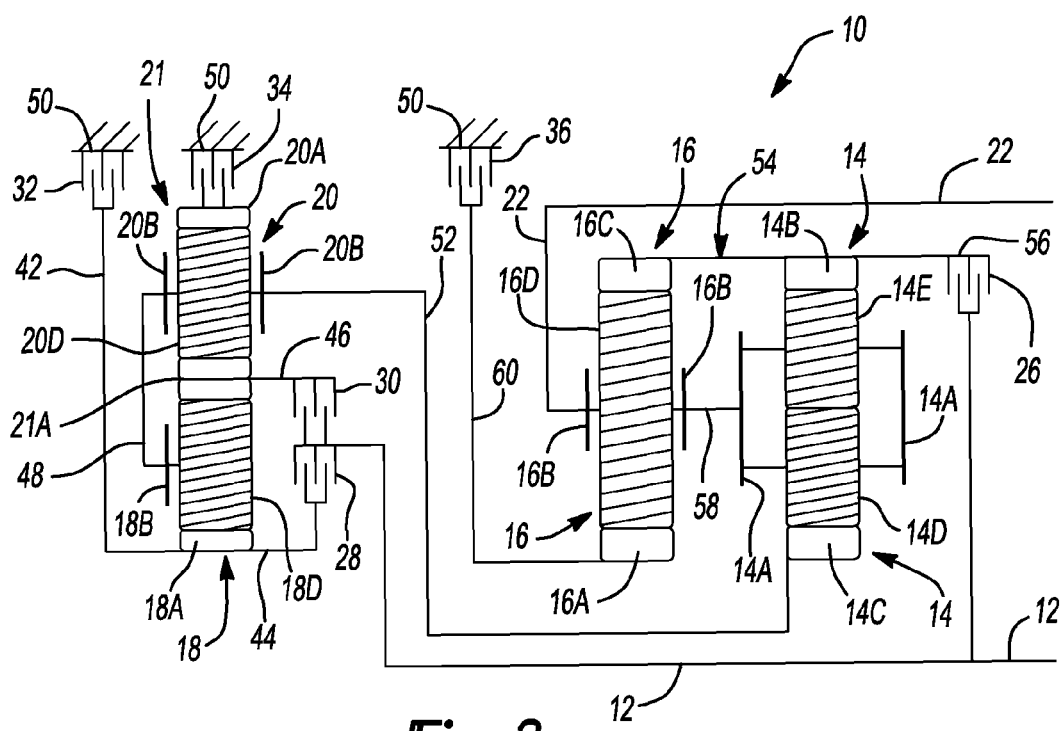
FIG. 2 is a diagrammatic illustration of an embodiment of a nine speed transmission according to the present invention.

Referring now to FIG. 2, a stick diagram presents a schematic layout of the embodiment of the nine speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

Planetary gear sets 18 and 20 are planetary gear sets that are configured to form a stacked planetary gear set arrangement 21. Stacked planetary gear set arrangement 21 includes a common member 21A. Common member 21A functions as the ring gear member of planetary gear set 18 and simultaneously as the sun gear member of planetary gear set 20. Planetary gear set 18 further includes a sun gear member 18A and a planet gear carrier member 18B that rotatably supports a set of planet gears 18D (only one of which is shown). The sun gear member 18A is connected for common rotation with a first shaft or interconnecting member 42 and with a second shaft or interconnecting member 44. The ring gear member or common member 21A is connected for common rotation with a third shaft or interconnecting member 46. The planet carrier member 18B is connected for common rotation with a fourth shaft or interconnecting member 48. The planet gears 18D are each configured to intermesh with both sun gear member 18A and ring gear or common member 21A.

In planetary gear set 20, common member 21A functions as the sun gear member of planetary gear set 20. Planetary gear set 20 further includes a ring gear member 20A and a planet gear carrier member 20B that rotatably supports a set of planet gears 20D (only one of which is shown). As stated above with respect to planetary gear set 18, common member 21A is connected for common rotation with the third shaft or interconnecting member 46. The ring gear member 20A is connected for common rotation with the second brake 34. The planet carrier member 20B is connected for common rotation with a fourth shaft or interconnecting member 48 and with a fifth shaft or interconnecting member 52. The planet gears 20D are each configured to intermesh with both sun gear member or common member 21A and ring gear member 20A. Of course, the present invention contemplates that the carrier members 18B and 20B of planetary gear sets 18 and 20 may be combined to form a single carrier member.

The planetary gear set 14 includes a sun gear member 14C, a ring gear member 14B and a planet gear carrier member 14A that rotatably supports a first set of planet gears 14D (only one of which is shown) and a second set of planet gears 14E (only one of which is shown). The sun gear member 14C is connected for common rotation with the fifth shaft or interconnecting member 52. The ring gear member 14B is connected for common rotation with the sixth shaft or interconnecting member 54 and with the seventh shaft or interconnecting member 56. The planet carrier member 14A is connected for common rotation with an eighth shaft or interconnecting member 58. The first set of planet gears 14D are each configured to intermesh with both the sun gear member 14C and the second set of planet gears 14E. The second set of planet gears 14E are each configured to intermesh with both the ring gear member 14B and the first set of planet gears 14D.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with a ninth shaft or interconnecting member 60. The ring gear member 16C is connected for common rotation with the sixth shaft or interconnecting member 54. The planet carrier member 16B is connected for common rotation with the eighth shaft or interconnecting member 58 and with output member or shaft 22. The planet gears 16D are each configured to intermesh with both the sun gear member 16A and the ring gear member 16C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28, 30 and brakes 32, 34 and 36 allow for selective interconnection of the shafts or interconnecting members, members of the planetary gear sets and the transmission housing. For example, the first clutch 26 is selectively engageable to connect the seventh shaft or interconnecting member 56 with the input shaft or member 12. The second clutch 28 is selectively engageable to connect the second shaft or interconnecting member 44 with the input shaft or member 12. The third clutch 30 is selectively engageable to connect the second shaft or interconnecting member 46 with the input shaft or member 12. The first brake 32 is selectively engageable to connect the first shaft or interconnecting member 42 with the stationary element or the transmission housing 50 in order to restrict the member 42 from rotating relative to the transmission housing 50. The second brake 34 is selectively engageable to connect the ring member 20A with the stationary element or the transmission housing 50 in order to restrict the member 20A from rotating relative to the transmission housing 50. The third brake 36 is selectively engageable to connect the ninth shaft or interconnecting member 60 with the stationary element or the transmission housing 50 in order to restrict the member 60 from rotating relative to the transmission housing 50.

Figure 3:
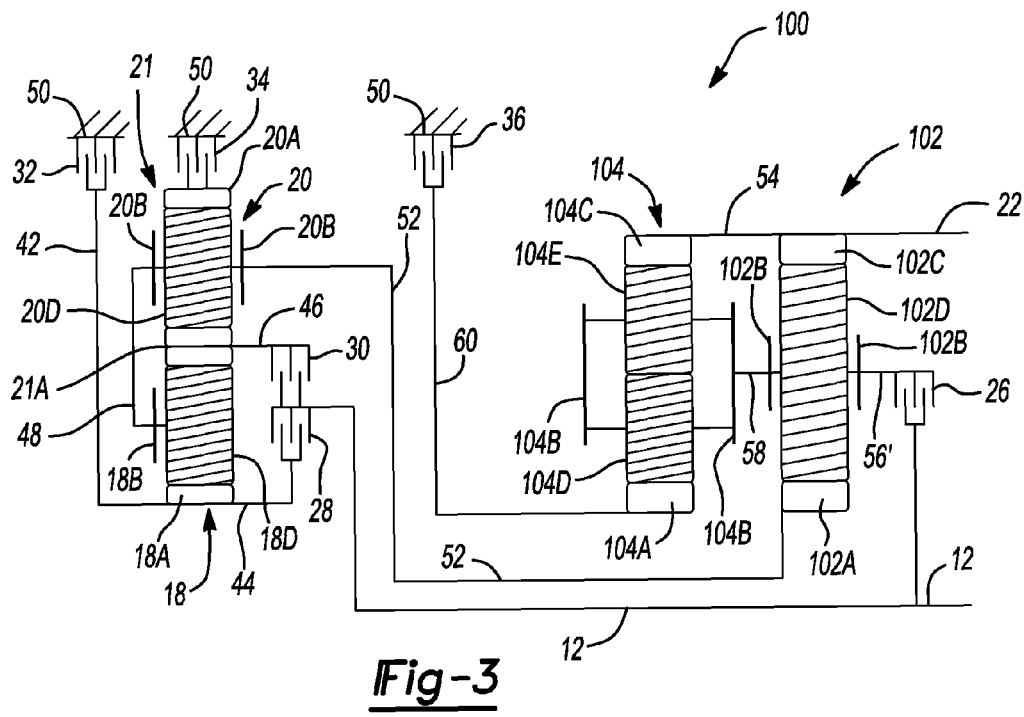
FIG. 3 is a diagrammatic illustration of another embodiment of a nine speed transmission according to the present invention.

In another embodiment of the present invention, a nine speed transmission 100 is provided. As shown in FIG. 3, the configuration and arrangement of the stacked planetary gear set 21, the interconnecting members or shafts 42, 44, 46, 48, 52, 54, 58 and 60 and the torque transmitting elements or clutches and brakes 26, 28, 30, 32, 34 and 36 remain the same as in the nine speed transmission 10 described above. However, planetary gear set 14 is replaced by planetary gear set 102 and planetary gear set 16 is replaced by planetary gear set 104. Moreover, shaft or interconnecting member 56 has been reconfigured as shaft or interconnecting member 56'.

The planetary gear set 102 includes a sun gear member 102A, a ring gear member 102C and a planet gear carrier member 102B that rotatably supports a set of planet gears 102D (only one of which is shown). The sun gear member 102A is connected for common rotation with the fifth shaft or interconnecting member 52. The ring gear member 102C is connected for common rotation with the sixth shaft or interconnecting member 54 and with output member or shaft 22. The planet carrier member 102B is connected for common rotation with the eighth shaft or interconnecting member 58 and with the reconfigured seventh shaft or interconnecting member 56'. The planet gears 102D are each configured to intermesh with both the sun gear member 102A and the ring gear member 102C.

Planetary gear set 104 includes a sun gear member 104A, a ring gear member 104C and a planet gear carrier member 104B that rotatably supports a first set of planet gears 104D (only one of which is shown) and a second set of planet gears 104E (only one of which is shown). The sun gear member 104A is connected for common rotation with the ninth shaft or interconnecting member 60. The ring gear member 104C is connected for common rotation with the sixth shaft or interconnecting member 54. The planet carrier member 104B is connected for common rotation with an eighth shaft or interconnecting member 58. The first set of planet gears 104D are each configured to intermesh with both the sun gear member 104A and the second set of planet gears 104E. The second set of planet gears 104E are each configured to intermesh with both the ring gear member 104C and the first set of planet gears 104D.

Moreover, in the instant embodiment the output shaft or member 22 is connected for common rotation with ring gears 104C and 102C and not to the carrier member of the second planetary gear set as in the previous embodiment. Further, the first clutch 26 is selectively engageable to connect the reconfigured seventh shaft or interconnecting member 56' with the input shaft or member 12. As in the previous embodiment, the second clutch 28 is selectively engageable to connect the second shaft or interconnecting member 44 with the input shaft or member 12. The third clutch 30 is selectively engageable to connect the second shaft or interconnecting member 46 with the input shaft or member 12. The first brake 32 is selectively engageable to connect the first shaft or interconnecting member 42 with the stationary element or the transmission housing 50 in order to restrict the member 42 from rotating relative to the transmission housing 50. The second brake 34 is selectively engageable to connect the ring member 20A with the stationary element or the transmission housing 50 in order to restrict the member 20A from rotating relative to the transmission housing 50. The third brake 36 is selectively engageable to connect the ninth shaft or interconnecting member 60 with the stationary element or the transmission housing 50 in order to restrict the member 60 from rotating relative to the transmission housing 50.

Figure 4:
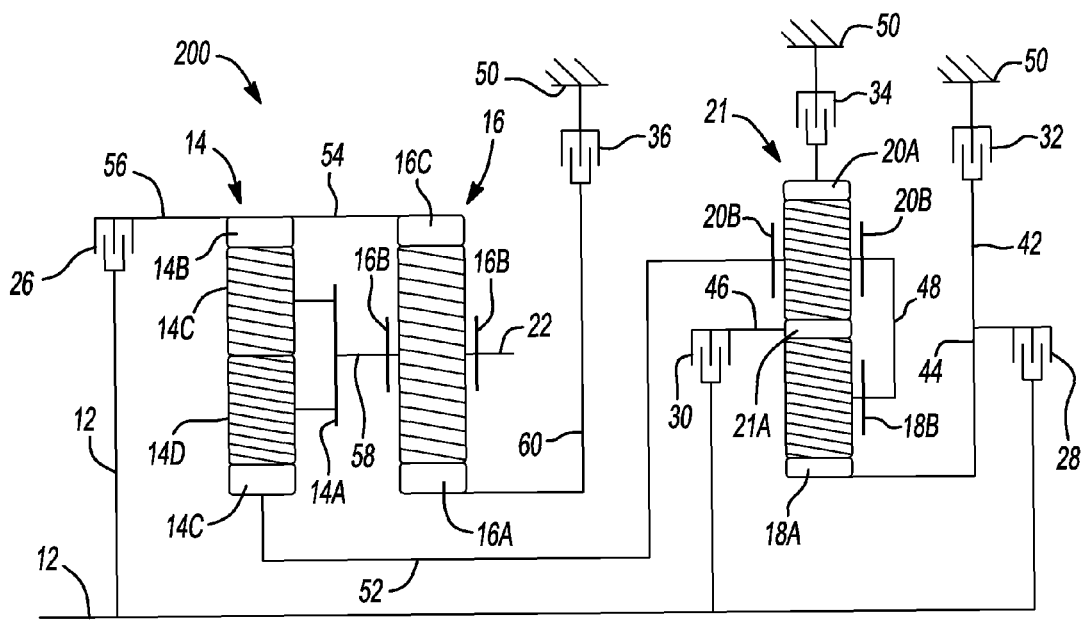
FIG. 4 is a diagrammatic illustration of another embodiment of a nine speed transmission according to the present invention.

In another embodiment of the present invention, a nine speed transmission 200 is provided. As shown in FIG. 4, the configuration of the stacked planetary gear set 21 and planetary gear sets 14 and 16, the interconnecting members or shafts 42, 44, 46, 48, 52, 54, 56, 58 and 60 and the torque transmitting elements or clutches and brakes 26, 28, 30, 32, 34 and 36 remain the same as in the nine speed transmission 10 described above. However, the relative positioning of the planetary gear sets has changed. The arrangement of the planetary gear sets 14, 16 and 21 of transmission 200 is the mirror image of the arrangement of the planetary gear sets 14, 16 and 21 of transmission 10. The shafts or interconnecting members have been shortened or lengthened as necessary to accommodate the new arrangement of the planetary gear sets. Further, shaft 42 is connected to sun gear 18A through shaft 44. Moreover, shaft or interconnecting member 56 connects clutch 26 to ring gear members 14B and 16C. Output member 22 is connected for common rotation with carrier member 16B. Of course, it is within the scope of the invention that any of the shafts or interconnecting members and planetary gear set members to which the shafts are connected may be combined to form a unitary member.

Figures 5, 6:
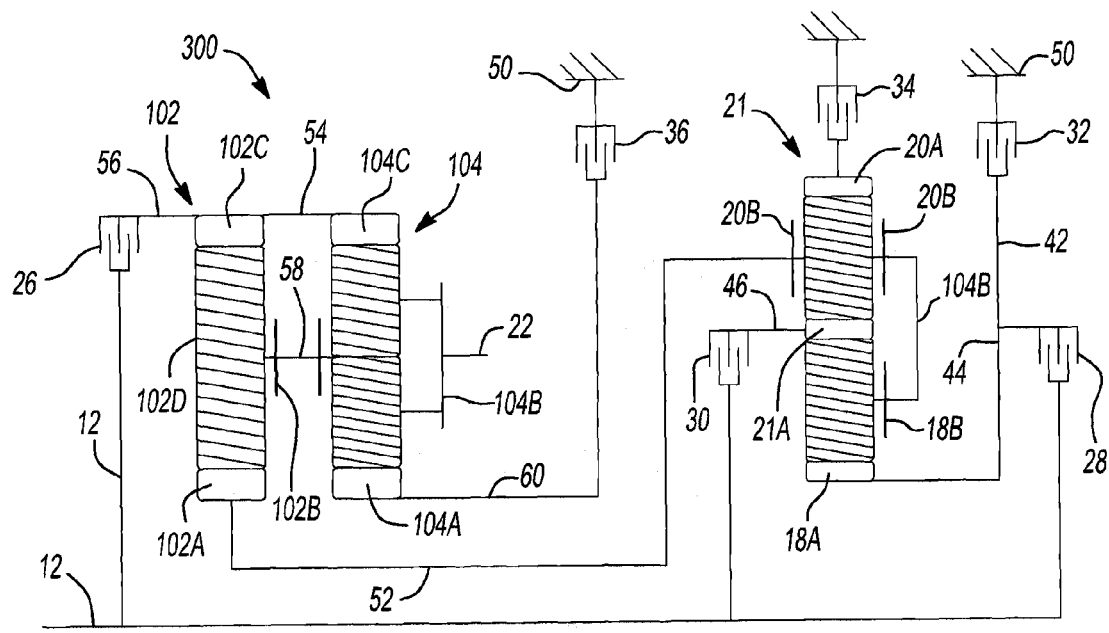
FIG. 5 is a diagrammatic illustration of another embodiment of a nine speed transmission according to the present invention.
FIG. 6 is a truth table presenting the state of engagement of the various torque transmitting elements in each of the available forward and reverse speeds or gear ratios of the transmission illustrated in FIGS. 2 and 4.

In another embodiment of the present invention, a nine speed transmission 300 is provided. As shown in FIG. 5, the configuration of the stacked planetary gear set 21 and planetary gear sets 102 and 104, the interconnecting members or shafts 42, 44, 46, 48, 52, 54, 58 and 60 and the torque transmitting elements or clutches and brakes 26, 28, 30, 32, 34 and 36 remain the same as in the nine speed transmission 100 described above. However, the relative positioning of the planetary gear sets has changed. The arrangement of the planetary gear sets 102, 104 and 21 of transmission 300 is the mirror image of the arrangement of the planetary gear sets 102, 104 and 21 of transmission 100. The shafts or interconnecting members have been shortened or lengthened as necessary to accommodate the new arrangement of the planetary gear sets. Further, shaft 42 is connected to sun gear 18A through shaft 44. Moreover, shaft or interconnecting member 56 now connects clutch 26 to ring gear members 102C and 104C. Output member 22 is connected to carrier member 104B. Of course, it is within the scope of the invention that any of the shafts or interconnecting members and planetary gear set members to which the shafts are connected may be combined to form a unitary member.

Referring now to FIGS. 2, 4 and FIG. 6, the operation of the embodiments of the nine speed transmissions 10 and 200 will be described. It will be appreciated that transmissions 10 and 200 are capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32, second brake 34 and third brake 36), as will be explained below. FIG. 6 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmissions 10 and 200. An example of the gear ratio steps that may be obtained using the embodiments of the present invention are also shown in FIG. 6. Of course, other gear ratios are achievable depending on the gear diameter, gear teeth count and gear configuration selected.

For example, to establish a reverse gear, second clutch 28 and second brake 34 and third brake 36 are engaged or activated. The second clutch 28 connects the second shaft or interconnecting member 44 with the input shaft or member 12. The second brake 34 connects the ring member 20A with the stationary element or the transmission housing 50 in order to restrict the member 20A from rotating relative to the transmission housing 50. The third brake 36 connects the ninth shaft or interconnecting member 60 with the stationary element or the transmission housing 50 in order to restrict the member 60 from rotating relative to the transmission housing 50. Likewise, the nine forward ratios are achieved through different combinations of clutch and brake engagement, as shown in FIG. 6.

Referring now to FIG. 7, a truth table is provided that presents the various combinations of torque-transmitting mechanisms that are activated or engaged to achieve the various gear states for nine speed transmissions 100 and 300 shown in FIGS. 3 and 5. The achievable numerical gear ratios and gear steps of the various gear states are also presented and are different than the other embodiments described. Although it should be appreciated that these numerical values are exemplary only and that they may be adjusted to accommodate various applications and operational criteria of the transmissions. The nine forward ratios and one reverse ratio are achieved through different combinations of clutch and brake engagement, as described above with respect to FIG. 6.

It will be appreciated that the foregoing explanation of operation and gear states of the nine speed transmissions 10, 200 and 300 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the essence of the invention are intended to be within the scope of the invention. Such variations are not to be regarded as a departure from the spirit and scope of the invention.

The invention claimed is:

1. A transmission comprising:
an input member;
a first planetary gear set having a first, a second and a third member;
a second planetary gear set having a first, a second and a third member;
a stacked planetary gear set arrangement having a first member, a second member, a third member, a fourth member and a fifth member;
an output member continuously interconnected for common rotation with the first member of the first planetary gear set;
a first interconnecting member continuously interconnecting the first member of the first planetary gear set with the second member of the second planetary gear set;
a second interconnecting member continuously interconnecting the second member of the first planetary gear set with the third member of the second planetary gear set;
a third interconnecting member continuously interconnecting the third member of the first planetary gear set with the fourth member of the stacked planetary gear set arrangement;
a fourth interconnecting member continuously interconnecting the second member of the stacked planetary gear set arrangement with the fourth member of the stacked planetary gear set arrangement; and
at least six torque transmitting mechanisms, wherein each of the torque transmitting mechanisms are selectively engageable to interconnect at least one of the first, second, third, fourth and fifth members of the stacked planetary gear set arrangement and the first, second and third members of the first and second planetary gear sets with at least one other of first, second, third, fourth and fifth members of the stacked planetary gear set arrangement, and the first, second and third members of the first and second planetary gear sets and a stationary member, and wherein the at least six torque transmitting mechanisms are selectively engageable in combinations of at least three to establish at least eight forward speed ratios and at least one reverse speed ratio between the input member and the output member.

2. The transmission of claim 1 wherein a first of the at least six torque transmitting mechanisms is selectively engageable to interconnect the second member of the first planetary gear set with the input member.

3. The transmission of claim 2 wherein a second of the at least six torque transmitting mechanisms is selectively engageable to interconnect the first member of the stacked planetary gear set arrangement with the input member.

4. The transmission of claim 3 wherein a third of the at least six torque transmitting mechanisms is selectively engageable to interconnect the fifth member of the stacked planetary gear set arrangement with the input member.

5. The transmission of claim 4 wherein a fourth of the at least six torque transmitting mechanisms is selectively engageable to interconnect the first member of the stacked planetary gear set arrangement with the stationary member.

6. The transmission of claim 5 wherein a fifth of the at least six torque transmitting mechanisms is selectively engageable to interconnect the third member of the stacked planetary gear set arrangement with the stationary member.

7. The transmission of claim 6 wherein a sixth of the at least six torque transmitting mechanisms is selectively engageable to interconnect the first member of the second planetary gear set with the stationary member.

8. The transmission of claim 1 wherein three of the at least six torque transmitting mechanisms are brakes for connecting at least one of the members of the stacked planetary gear set arrangement and first and second planetary gear sets to the stationary member and three of the at least six torque transmitting mechanisms are clutches for connecting at least one other of the members of the stacked planetary gear set arrangement and first and second planetary gear sets to at least one other member of the stacked planetary gear set arrangement and the first and second planetary gear sets.

9. The transmission of claim 1 wherein the third member of the first planetary gear set, the first member of the second planetary gear set and the first member of the stacked planetary gear set arrangement are sun gears, the second and fourth members of the stacked planetary gear set arrangement, the first member of the first planetary gear set and the second member of the second planetary gear set are carrier members and the second member of the first planetary gear set, the third member of the second planetary gear set and third member of the stacked planetary gear set arrangement are ring gears.

10. The transmission of claim 9 wherein the fifth member of the stacked planetary gear set arrangement meshes with the a first plurality of pinion gears rotatably supported by the second member of the stacked planetary gear set arrangement and with a second plurality of pinion gears rotatably supported by the fourth member of the stacked planetary gear set arrangement.

11. A transmission comprising:
an input member;
a first planetary gear set having a first, a second and a third member;
a second planetary gear set having a first, a second and a third member;
a stacked planetary gear set arrangement having a first member, a second member, a third member, a fourth member and a fifth member;
an output member continuously interconnected for common rotation with the first member of the first planetary gear set;
a first interconnecting member continuously interconnecting the first member of the first planetary gear set with the second member of the second planetary gear set;
a second interconnecting member continuously interconnecting the second member of the first planetary gear set with the third member of the second planetary gear set;
a third interconnecting member continuously interconnecting the third member of the first planetary gear set with the fourth member of the stacked planetary gear set arrangement;
a fourth interconnecting member continuously interconnecting the second member of the stacked planetary gear set arrangement with the fourth member of the stacked planetary gear set arrangement;
a first torque transmitting mechanism selectively engageable to interconnect the second member of the first planetary gear set with the input member;
a second torque transmitting mechanism selectively engageable to interconnect the first member of the stacked planetary gear set arrangement with the input member;
a third torque transmitting mechanism selectively engageable to interconnect the fifth member of the stacked planetary gear set arrangement with the input member;
a fourth torque transmitting mechanism selectively engageable to interconnect the first member of the stacked planetary gear set arrangement with the stationary member;
a fifth torque transmitting mechanism selectively engageable to interconnect the third member of the stacked planetary gear set arrangement with the stationary member; and
a sixth torque transmitting mechanism selectively engageable to interconnect the first member of the second planetary gear set with the stationary member, and
wherein the torque transmitting mechanisms are selectively engageable in combinations of at least three to establish at least eight forward speed ratios and at least one reverse speed ratio between the input member and the output member.

12. The transmission of claim 11 wherein the third member of the first planetary gear set, the first member of the second planetary gear set and the first member of the stacked planetary gear set arrangement are sun gears, the second and fourth members of the stacked planetary gear set arrangement, the first member of the first planetary gear set and the second member of the second planetary gear set are carrier members and the second member of the first planetary gear set, the third member of the second planetary gear set and third member of the stacked planetary gear set arrangement are ring gears.

13. The transmission of claim 11 wherein the fifth member of the stacked planetary gear set arrangement meshes with the a first plurality of pinion gears rotatably supported by the second member of the stacked planetary gear set arrangement and with a second plurality of pinion gears rotatably supported by the fourth member of the stacked planetary gear set arrangement.

14. A transmission comprising:
an input shaft;
a first planetary gear set having a sun gear, a carrier member for rotatably supporting a first plurality of pinion gears and a second plurality of pinion gears and a ring gear;
a second planetary gear set having a sun gear, a carrier member and a ring gear;
an output shaft continuously interconnected for common rotation with the carrier member of the second planetary gear set;
a stacked planetary gear set arrangement having a sun gear, a first carrier member for rotatably supporting a first plurality of pinion gears, a second carrier member for rotatably supporting a second plurality of pinion gears, a ring gear and a common member;

a first interconnecting member continuously interconnecting the carrier member of the first planetary gear set with the carrier member of the second planetary gear set;

a second interconnecting member continuously interconnecting the ring gear of the first planetary gear set with the ring gear of the second planetary gear set;

a third interconnecting member continuously interconnecting the sun gear of the first planetary gear set with the second carrier member of the stacked planetary gear set arrangement;

a fourth interconnecting member continuously interconnecting the first carrier member of the stacked planetary gear set arrangement with the second carrier member of the stacked planetary gear set arrangement;

a first torque transmitting mechanism selectively engageable to interconnect the ring gear of the first planetary gear set with the input member;

a second torque transmitting mechanism selectively engageable to interconnect the sun gear of the stacked planetary gear set arrangement with the input member;

a third torque transmitting mechanism selectively engageable to interconnect the common member of the stacked planetary gear set arrangement with the input member;

a fourth torque transmitting mechanism selectively engageable to interconnect the sun gear of the stacked planetary gear set arrangement with the stationary member;

a fifth torque transmitting mechanism selectively engageable to interconnect the ring gear member of the stacked planetary gear set arrangement with the stationary member; and a sixth torque transmitting mechanism selectively engageable to interconnect the sun gear of the second planetary gear set with the stationary member, and wherein the torque transmitting mechanisms are selectively engageable in combinations of at least three to establish at least eight forward speed ratios and at least one reverse speed ratio between the input member and the output member.

15. The transmission of claim 14 wherein the common member of the stacked planetary gear set arrangement meshes with the first plurality of pinion gears rotatably supported by the first carrier member of the stacked planetary gear set arrangement and with the second plurality of pinion gears rotatably supported by the second carrier member of the stacked planetary gear set arrangement.

16. A transmission comprising:
an input shaft;
a first planetary gear set having a sun gear, a carrier member and a ring gear;
an output shaft continuously interconnected for common rotation with the ring gear of the first planetary gear set;
a second planetary gear set having a sun gear, a carrier member for rotatably supporting a first plurality of pinion gears and a second plurality of pinion gears and a ring gear;
a stacked planetary gear set arrangement having a sun gear, a first carrier member for rotatably supporting a first plurality of pinion gears, a second carrier member for rotatably supporting a second plurality of pinion gears, a ring gear and a common member;
a first interconnecting member continuously interconnecting the carrier member of the first planetary gear set with the carrier member of the second planetary gear set;

a second interconnecting member continuously interconnecting the ring gear of the first planetary gear set with the ring gear of the second planetary gear set;

a third interconnecting member continuously interconnecting the sun gear of the first planetary gear set with the second carrier member of the stacked planetary gear set arrangement;

a fourth interconnecting member continuously interconnecting the first carrier member of the stacked planetary gear set arrangement with the second carrier member of the stacked planetary gear set arrangement;

a first torque transmitting mechanism selectively engageable to interconnect the carrier member of the first planetary gear set with the input member;

a second torque transmitting mechanism selectively engageable to interconnect the sun gear of the stacked planetary gear set arrangement with the input member;

a third torque transmitting mechanism selectively engageable to interconnect the common member of the stacked planetary gear set arrangement with the input member;

a fourth torque transmitting mechanism selectively engageable to interconnect the sun gear of the stacked planetary gear set arrangement with the stationary member;

a fifth torque transmitting mechanism selectively engageable to interconnect the ring gear member of the stacked planetary gear set arrangement with the stationary member; and a sixth torque transmitting mechanism selectively engageable to interconnect the sun gear of the second planetary gear set with the stationary member, and wherein the torque transmitting mechanisms are selectively engageable in combinations of at least three to establish at least eight forward speed ratios and at least one reverse speed ratio between the input member and the output member.

17. The transmission of claim 16 wherein the common member of the stacked planetary gear set arrangement meshes with the first plurality of pinion gears rotatably supported by the first carrier member of the stacked planetary gear set arrangement and with the second plurality of pinion gears rotatably supported by the second carrier member of the stacked planetary gear set arrangement.

18. A transmission comprising:
an input shaft;
an output shaft;
a first planetary gear set having a sun gear, a carrier member and a ring gear;
a second planetary gear set having a sun gear, a carrier member for rotatably supporting a first plurality of pinion gears and a second plurality of pinion gears and a ring gear;
a stacked planetary gear set arrangement having a sun gear, a first carrier member for rotatably supporting a first plurality of pinion gears, a second carrier member for rotatably supporting a second plurality of pinion gears, a ring gear and a common member;
a first interconnecting member continuously interconnecting the carrier member of the first planetary gear set with the carrier member of the second planetary gear set;

a second interconnecting member continuously interconnecting the ring gear of the first planetary gear set with the ring gear of the second planetary gear set;

a third interconnecting member continuously interconnecting the sun gear of the first planetary gear set with the second carrier member of the stacked planetary gear set arrangement;

a fourth interconnecting member continuously interconnecting the first carrier member of the stacked planetary gear set arrangement with the second carrier member of the stacked planetary gear set arrangement;

a first torque transmitting mechanism selectively engageable to interconnect the ring gear of the first planetary gear set with the input member;

a second torque transmitting mechanism selectively engageable to interconnect the sun gear of the stacked planetary gear set arrangement with the input member;

a third torque transmitting mechanism selectively engageable to interconnect the common member of the stacked planetary gear set arrangement with the input member;

a fourth torque transmitting mechanism selectively engageable to interconnect the sun gear of the stacked planetary gear set arrangement with the stationary member;

a fifth torque transmitting mechanism selectively engageable to interconnect the ring gear member of the stacked planetary gear set arrangement with the stationary member; and a sixth torque transmitting mechanism selectively engageable to interconnect the sun gear of the second planetary gear set with the stationary member, and wherein the torque transmitting mechanisms are selectively engageable in combinations of at least three to establish at least eight forward speed ratios and at least one reverse speed ratio between the input member and the output member.

19. The transmission of claim 18 wherein the common member of the stacked planetary gear set arrangement meshes with the first plurality of pinion gears rotatably supported by the first carrier member of the stacked planetary gear set arrangement and with the second plurality of pinion gears rotatably supported by the second carrier member of the stacked planetary gear set arrangement.

20. The transmission of claim 19 wherein the output shaft is continuously interconnected for common rotation with the carrier member of the second planetary gear set.

* * * * *